(12) United States Patent
Trossell et al.

(10) Patent No.: US 7,831,575 B2
(45) Date of Patent: Nov. 9, 2010

(54) LIBRARY VIRTUALISATION MODULE

(75) Inventors: David Paul Trossell, Lymington (GB); Jean-Jacques Dauchot, Poole (GB)

(73) Assignee: Bridge Works, Ltd, New Milton (GB)

( * ) Notice: Subject to any disclaimer, the term of this patent is extended or adjusted under 35 U.S.C. 154(b) by 0 days.

(21) Appl. No.: 10/208,358

(22) Filed: Jul. 30, 2002

(65) Prior Publication Data

US 2003/0037046 A1    Feb. 20, 2003

Related U.S. Application Data

(60) Provisional application No. 60/326,499, filed on Oct. 2, 2001.

(30) Foreign Application Priority Data

Aug. 2, 2001  (GB) .................................. 0118900.0

(51) Int. Cl.
*G06F 17/30*    (2006.01)
(52) U.S. Cl. ...................................................... 707/705
(58) Field of Classification Search ............. 395/80–84, 395/182.04, 275; 711/4, 112; 707/1–10, 707/104, 3
See application file for complete search history.

(56) References Cited

U.S. PATENT DOCUMENTS

| | | | |
|---|---|---|---|
| 5,121,483 A * | 6/1992 | Monahan et al. ............... 710/40 |
| 5,479,581 A * | 12/1995 | Kleinschnitz ................ 700/247 |
| 6,044,442 A | 3/2000 | Jesionowski ................. 711/153 |
| 6,052,341 A | 4/2000 | Bingham et al. .............. 369/34 |
| 6,240,467 B1 | 5/2001 | Beardsley et al. |
| 6,328,766 B1 * | 12/2001 | Long .............................. 710/8 |
| 6,480,905 B1 | 11/2002 | Jesionowski et al. |
| 6,507,834 B1 * | 1/2003 | Kabra et al. .................... 707/2 |
| 6,519,678 B1 | 2/2003 | Basham et al. |
| 6,636,778 B2 | 10/2003 | Basham et al. |
| 6,675,260 B2 | 1/2004 | Torrey et al. |
| 6,950,723 B2 | 9/2005 | Gallo et al. |
| 7,062,614 B2 | 6/2006 | Camble et al. |
| 2006/0080507 A1 * | 4/2006 | Tyndall et al. ............... 711/132 |

FOREIGN PATENT DOCUMENTS

EP          0859308 A1    8/1998
WO    WO-01/22210 A1    3/2001

* cited by examiner

*Primary Examiner*—Charles Rones
*Assistant Examiner*—Mellissa M Chojnacki
(74) *Attorney, Agent, or Firm*—Raj Abhyanker LLP

(57) ABSTRACT

A library virtualisation module (LVM) 13 is disclosed, the LVM being configured to connect first and second hosts 11, 12 to a library 14. The LVM comprises least two host input/outputs, each for connection to a respective host; and a library input/output, for connection to the library 14. The LVM 13 is arranged to modify requests received at its host input/outputs and to provide modified requests to the library input/output in such a way as to divide resources of the library 14 between the hosts 11, 12 without requiring unmodified requests to take into account the division of resources.

32 Claims, 2 Drawing Sheets

LIBRARY VIRTUALISATION MODULE

BACKGROUND OF THE INVENTION

This invention relates to a library virtualisation module, and to a library system including a library virtualisation module.

A tape library, such as the ADIC Scalar 100 library, consists of a housing in which is included a robot and a number of 'elements', namely a number of tape drivers, plural normal tape slots and at least one import/export tape slot. Tape slots are typically tape receptacles in the walls of the housing, and import/export slots are typically receptacles in a door of the housing, which allow tapes to be introduced into and taken from the library by a human user. Each tape drive typically has a small computer serial interface (SCSI) connection to a single host computer, which also sends SCSI signals to control the robot to move tapes between the tape slots and the tape drives. Tape libraries, or more particularly the robot thereof, are able typically, in response to a request from the host, to determine what tapes it contains in which slots, and to convey this information to the host along with information concerning the number of tape drives, normal slots and import/export slots that it has.

Conventionally, only one host has been able to use a library. However, Spectrologics and Quantum ATC both vend libraries which are able to be connected to plural hosts, enabling each host to use the resources of the library. Digital Interfaces Limited vend a system allowing plural hosts to connect to a robot of a single library via respective TA40 devices. The outputs of the TA40 devices are connected together and to an input/output of the library. Each of these arrangement is satisfactory.

SUMMARY OF THE INVENTION

According to a first aspect of this invention, there is provided a library virtualisation module (LVM), for connecting plural hosts to a library, the LVM comprising: at least two host input/outputs, each for connection to a respective host; and a library input/output, for connection to a library, the LVM being arranged to modify requests received at its host input/outputs and to provide modified requests to the library input/output in such a way as to divide resources of the library between hosts without requiring unmodified requests to take into account the division of resources.

This invention can allow connection of plural hosts to a single conventional library, and can divide the resources of the library between the hosts without the hosts knowing that they do not have exclusive use of the library or knowing which of the resources of the library are allocated to them. This is advantageous since existing libraries can be divided between plural hosts with improvements in library use efficiency. This may also allow, for use with plural hosts, the purchase of one, larger library rather than the purchase of plural smaller libraries, which may result in significant cost savings. Moreover, the invention may allow the use of conventional hosts, which do not need to use any commands other than conventional commands.

According to a second aspect of this invention, there is provided a library virtualisation module for connecting plural hosts to a library, the LVM comprising: at least two host input/outputs, each for connection to a respective host; and a library input/output, for connection to a library, the LVM being arranged to provide a library resources request at the library input/output and, subsequent to a reply received at the library input/output, to divide resources of the library between the hosts.

BRIEF DESCRIPTION OF THE DRAWINGS

Embodiments of the invention will now be described, by way of example only, with reference to the accompanying drawings of which.

DETAILED DESCRIPTION OF THE INVENTION

Figure 1:
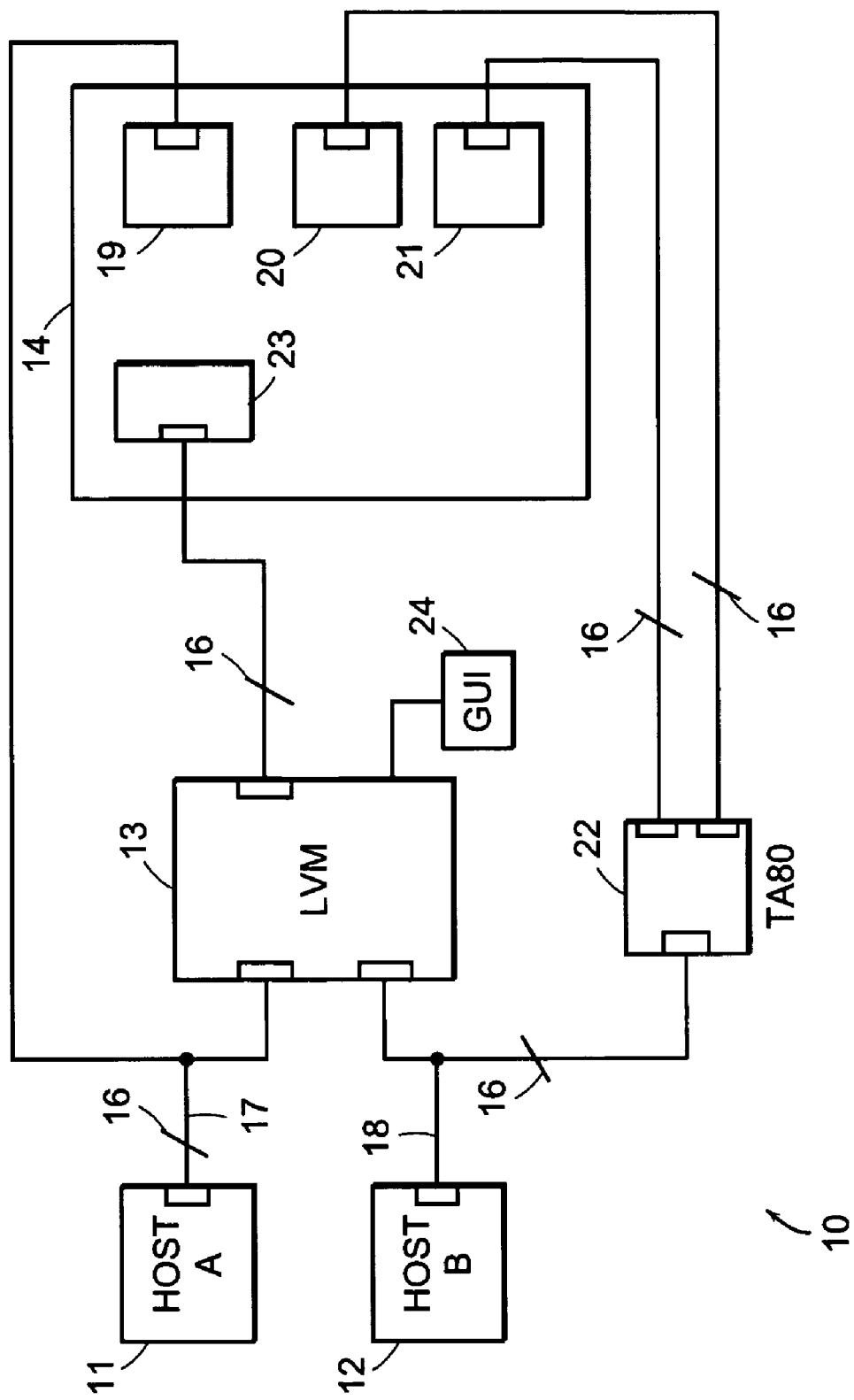
FIG. 1 is a schematic diagram of a library virtualisation module (LVM) in accordance with the invention connected to a library and to plural hosts.

Referring to FIG. 1, a library system 10 is shown comprising generally a first host 11 (host A), a second host 12 (host B), a library virtualisation module (LVM) 13 and a library 14. Each host 11, 12 has a 16 bit wide SCSI input/output which is connected via a respective SCSI connection 17, 18 to a respective host input/output of the LVM 13. The SCSI connector 17 of the first host 11 is also connected to a SCSI input/output of a first tape drive 19, which forms part of the library 14. Second and third tape drives 20, 21 (also forming part of the library 14) are connected to a TA80 device 22, vended by Digital Interfaces Limited. The TA80 device 22 is a type of multiplexer. It is able to duplicate data received at its input/output which is connected to the second host 12, and to provide a copy of this data on each of its input/outputs which are connected to the tape drives 20, 21, or alternatively to only one of them. With data flow in the other direction, the TA80 device 22 may interleave data received at the input/outputs which are connected to the tape drives 20, 21, and provide the interleaved data to the second host 12. In this case, the length of the data bursts of each interleave depends on, in particular, the size of the memory of the TA80 device 22. If data is being provided by only one of the drives 20, 21, this is passed directly to the second host. The TA80 device 22 connects both of the second and third tape drives 20, 21 to the SCSI connector 18 of the second host 12, to allow data transfer between the second host and each of the second and third tape drives. The LVM 13 has an 16-bit SCSI connection to a robot 23, which forms part of the library 14. The LVM 13 is also connected via a further SCSI connection to a graphical user interface (GUI) 24, which is preferably a windows-driven laptop computer. The library 14, including the components within it, and the first and second hosts 11, 12 are entirely conventional devices.

The LVM 13 serves to divide the resources of the library 13, between the hosts 11 and 12. In this connection, 'resources' means normal slots and import/export slots, which are not shown in FIG. 1. The tape drives 19-21 are also divided between the hosts 11, 12; this is effected in part by the physical connection of the tape drives to the hosts, but the LVM 13 also has information concerning which tape drives are assigned to which host. This division can be considered to be a virtual division since there is no physical separation of the resources. In this example, the library 14 has 45 normal slots and ten import/export slots. A user instructs the LVM 13 through the GUI 24 to allocate, for example, normal slot numbers 0-14 and import/export slot numbers 0-4 to the host 11, and to allocate normal slot numbers 15-44 and import/export slot numbers 5-9 to the second host 12. The LVM 13 stores information corresponding the elements of the library to an absolute address for each host, for example, Host B-normal-slot 0 . . . 29 Library-normal-slot 15 . . . 44 and so on.

The LVM 13 intercepts SCSI commands from the hosts 11, 12, and intercepts SCSI reply signals from the library 14 (more particularly, a controller (not shown) of the robot 23). Most of these commands and signals are passed through to the relevant input/output without modification. There are, however, a number of exceptions to this.

When a host, for example the second host 12, sends a SCSI command signal known as 'mode sense', it expects the library 14 to reply with information detailing the number and start address (in absolute terms) of the robots, normal slots, import/export slots and tape drives that the library has. In fact, the mode sense signal is intercepted by the LVM 13, which then modifies the signal and forwards the modified signal onto the robot 23. The robot 23 responds with an SCSI response, which indicates the number and absolute starting address of its robots, normal slots, import/export slots and tape drives, and this response is intercepted by the LVM 13. The LVM modifies the SCSI response to represent the elements of the library 14 that are allocated to the second host 12. This modified response is an SCSI response which shows a reduced number of tape drives, normal slots and import/export slots to that of the response provided by the robot 23, although the absolute start addresses remain unchanged, i.e. the absolute addresses begin at zero. It is possible to allow the host to believe that the start addresses of the elements allocated to it (which the host believes to be the entire resources of the library) are different to the actual addresses, because address translation is performed by the LVM 13.

When a host, for example the second host 12, wants a tape moved between a tape drive and a slot, it issues a SCSI command, which is then intercepted by the LVM 12. The LVM 13 modifies the command to change the slot and/or tape address used by the second host 12 to the corresponding slot and/or tape address stored in a memory (not shown) of the LVM. For example, if the second host 12 requests movement of a tape from tape drive number 1 to normal slot number if the LVM 13 modifies the tape address to number 2 and the normal slot address to number 26, since these are the corresponding addresses (the second host's tape drives start at 1 and its normal slots start at 15). The modified command is then fed from the LVM 13 to the robot 23, which moves the tape in the manner requested. It will be seen that this results in only the resources of the library 14 which are allocated to the second host 12 being affected, whereas it would have been a tape allocated to the first host 11 which would have been moved (and then to the wrong drive) if the LVM 13 had not modified the addresses in the SCSI command.

On completion of a tape movement task, the robot 23 signals this completion to the LVM 13. If, in the meantime, the LVM 13 receives a request from the other host 11, 12 to move a tape, the LVM modifies the request as necessary, and places the modified request into a queue. Only when the LVM 13 receives confirmation that the robot 23 has completed its original task does the LVM feed the later modified request to the robot. This feature allows all tape movement requests to be effected by the robot 23 without the hosts 11, 12 having to communicate in any way. If other requests, such as mode sense requests, are made whilst the robot 23 is busy, these requests are also queued until the robot 23 becomes free. If plural requests build in the queue, these are dealt with in a first-in, first-out fashion.

Occasionally, a host 11, 12 may issue a 'SCSI reset' or 're-initialise' request, which would normally cause the robot 23 to re-initialise and to perform a check on all of the elements in the library 14. However, the LVM 13 is arranged to block such requests, and to generate a confirmation command, which is then sent to the host 11, 12 which made the request indicating that the reset has been completed. However, no reset command ever reaches the robot 23, so no reset is performed in such circumstances. Resetting of the robot 23 is effected only by way of a reset command entered into the LVM 13 by way of the GUI 24.

If a user opens the door of the library 14, the library detects this and sends a 'unit attention' signal from the robot 23. This signal is intercepted by the LVM 13, whereas conventionally is would have been sent to the host. The 'unit attention' signal indicates that some change, for example in the numbers and locations of tapes in the library, may have taken place, although the library 14 cannot confirm this without performing a re-initialize operation. The 'unit attention' signal is passed to the hosts 11, 12 only in response to a request from that host to access the library, for example a request to move a tape from a slot to a tape drive. The 'unit attention' signal is stored in the LVM 13 until both drives have made such an access request, and have therefore been informed of the unit attention signal, whereupon it is deleted.

In an alternative embodiment (not shown), only two tape drives are included in the library 14, with these tape drives being connected on a one-to-one basis to the hosts 11, 12. It will be appreciated that any number of tape drives may be connected to a given host.

Figure 2:
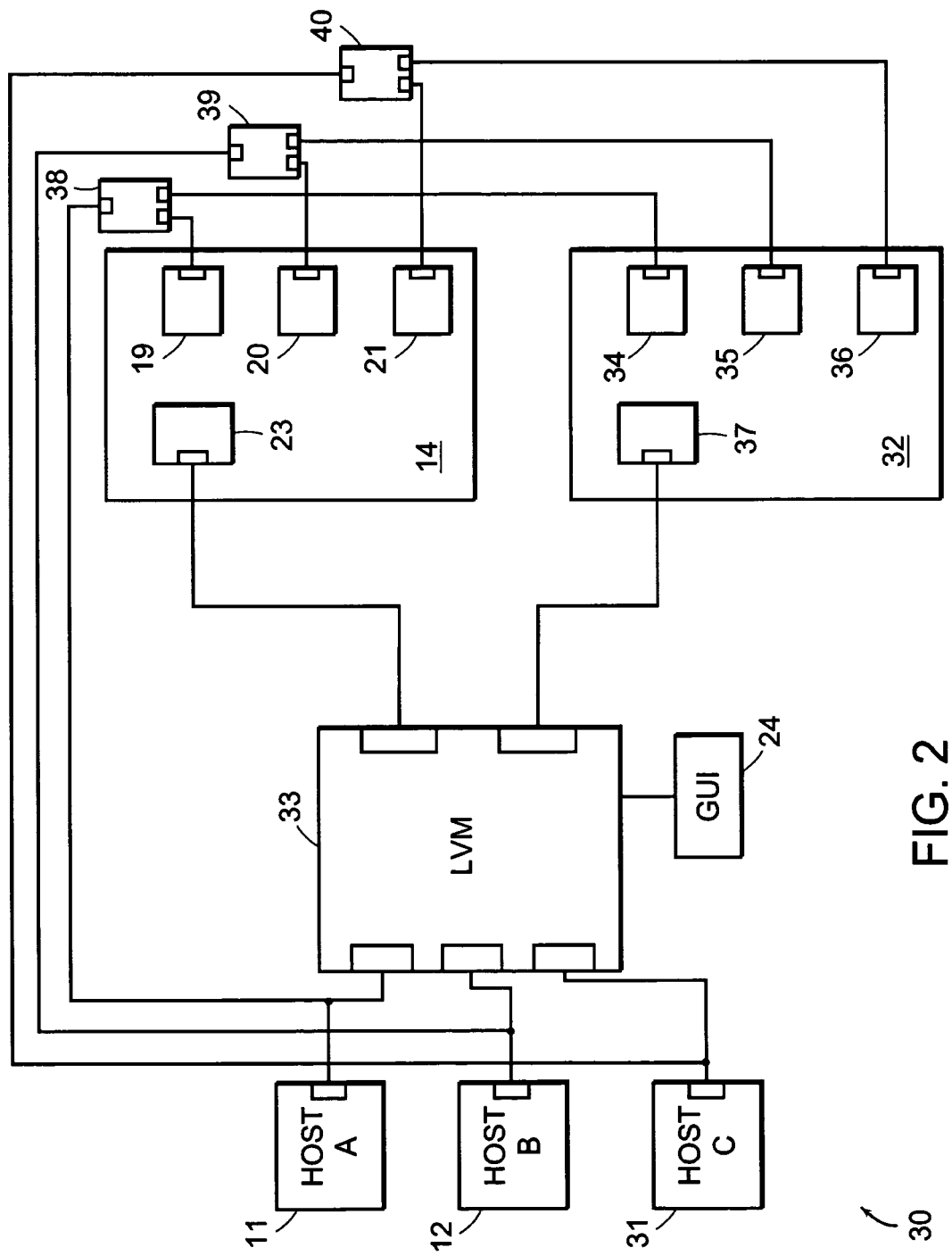
FIG. 2 is a schematic diagram of an alternative embodiment of LVM, in an alternative library system.

A second library system 20 including a LVM according to the invention is shown in FIG. 2. Referring to FIG. 2, the library system 30 comprises first, second and third hosts 11, 12, 31, first and second libraries 14, 32, and an LVM 33. Each of the libraries 14, 32 includes first to third tape drives 19-21, 34-36, corresponding ones of which are connected via a respective TA80 device 38-40 to a respective one of the hosts 11, 12, 31. Each host 11, 12, 31 is, therefore, connected to one, and only one, tape drive 19-21, 24-36 in each library 14, 32. Each host 11, 12, 31 is also connected to a respective host input/output of the LVM 13. The LVM 13 has first and second library input/outputs, which are connected to a robot 23 of the first library and a robot 37 of the library respectively.

Operation of the LVM 33 is generally the same as that of the FIG. 1 LVM, although the LVM 33 supports two additional operating modes: mirroring and data splicing. In mirroring mode, the LVM 33 controls the robots 23 and 37 to make the same movements. The TA80 devices 38-40 duplicate data received at their respective inputs to each of their respective outputs. Provided the tape slots of the libraries are identically stocked with tapes, this mode of operation results in data provided by a host 11, 12, 31 being stored on one tape in each of the libraries 14, 32. Hence two copies of the data is made, and this is achieved without the knowledge of any of the hosts 11, 12, 31.

In data splicing mode, the TA80 devices 38-40 each divide data provided by their respective host 11, 12, 31 between the two tape drives connected to the TA80 device, i.e. half of the data is stored on a tape of the first library 14 and half of the data is stored on a tape of the second library 32. This allows data to be stored on tape at up to twice the maximum operating speed of the tape drives.

In an alternative embodiment (not shown), the LVM 33 is provided with only one library input/output, which is connected to both of the robots 23, 37. In this embodiment, SCSI commands sent from the LVM 33 contain a simple address, which allows each robot 23, 37 to determine if the commands are destined for it, or for another robot. Of course, more than two libraries could be connected to a library input/output of an LVM 33.

The LVM 13 is arranged, following power-up or re-boot, to provide a mode sense signal at the or each library input/output. In response, the or each library 14, 32 responds with data indicating the number of tape chives, normal slots and import/export slots that it has. The LVM 13 then detects whether it should automatically divide the resources of the or each library 14, 32 on the basis of predetermined parameters stored internally, or whether it should take input from the GUI 24. If automatic division is required, the LVM 13 divides the elements between the hosts 11, 12, 31 equally. If the number of any particular element is not divisible by the number of hosts to produce an integer, any extra elements (i.e. the difference between the actual number of elements and the largest number which is less than the number of elements yet is divisible by the number of hosts to provide an integer) are assigned to the first host 11. Of course, other schemes may be used to automatically divide the resources of the library or libraries 14, 32 between the hosts 11, 12, 31.

If a user input is required, the LVM 13 does not divide the resources of the or each library 14, 32 until an input is received via the GUI 24. A typical user input may be that the first host 11 is to be allocated ten normal slots and three import/export slots. The LVM 13 then allocates the remaining resources to the other host 12 or, if there is more than one other host, divides the remaining resources between these other hosts.

Alternatively, the LVM 13 may be pre-programmed to divide the resources of the library or libraries 14, 32 in a more fixed manner, i.e. to allocate a certain number of slots to the first host, and to allocate any extra resources between the other host or hosts, instead of dividing the resources equally. Because tape drives are connected directly to the hosts themselves, the LVM 13 is either pre-programmed with tape drive allocation information, or is arranged to require a user input, which allows the LVM to allocate tape drives in a manner consistent with the way in which they are wired-up.

Since a mode sense request does not provide the LVM 13 with any information concerning what slots are occupied and with what tapes, the LVM is operable, in response to a user input at the GUI 24, to provide a read element status request at the or each library input/output. The response by the or each library 14, 32 is stored in the LVM 13 until it has been supplied to each host 11, 12, 31, whereupon it is deleted.

TA40 devices, also vended by Digital Interfaces Limited, may be used in place of the TA80 devices for all of the above described functions.

What is claimed is:

1. A library virtualization module (LVM) comprising:
   at least first and second bidirectional host input/output, each for connection to a respective associated one of at least first and second hosts; and
   a bidirectional library input/output, for connection to a library, said library having resources divisible into at least first and second divisions of resources,
   a processor comprising instruction for causing the LVM to:
   divide said resources of said library between said at least first and second hosts to allocate a first division of resources to said first host and to allocate a second division of resources to said second host;
   receive Small Computer Serial Interface (SCSI) commands at said at least first and second bidirectional host input/outputs;
   receive a first SCSI command at the first bidirectional host input/output, the first SCSI command relating to a resource outside of the first division of resources;
   modify the first SCSI command to provide a modified SCSI command so that the only resources to which the modified SCSI command relates are said first division of resources of said library; provide said modified SCSI command to said bidirectional library input/output;
   receive at said bidirectional library input/output library resource information comprising one of: a) address information relating to library resources, b) information quantifying the library resources, and c) address information relating to library resources and information quantifying the library resources,
   modify said library resource information to provide modified information, and provide the resulting modified information to one of said at least first and second bidirectional host input/outputs;
   record a unit attention signal received at said bidirectional library input/output following recording of said unit attention signal, receive an access request at said first bidirectional host input/output;
   supply data representative of said unit attention condition to said first bidirectional host input/outputs in response to receiving said access request at said first bidirectional host input/output, following recording of said unit attention signal receive an access request at said second bidirectional host input/output;
   supply data representative of said unit attention signal to said second bidirectional host input/output in response to receiving said access request at said second bidirectional host input/output; and
   delete said unit attention signal subsequent to supplying said data representative of said unit attention signal to both of said first and second bidirectional host input/outputs.

2. The library virtualization module as claimed in claim 1, the processor further comprising instructions for causing the LVM to modify absolute addresses of resources of said library according to said at least first and second divisions of the resources.

3. The library virtualization module as claimed in claim 1, the processor further comprising instructions for causing the LVM to queue SCSI commands received at said bidirectional host input/outputs and to pass queued SCSI commands to the bidirectional library input/output only on a determination that a previous SCSI command has been executed.

4. The library virtualization module as claimed in claim 1, further comprising a second bidirectional library input/output.

5. The library virtualization module as claimed in claim 4, the processor further comprising instructions for causing the LVM to facilitate mirroring of data received at least one of said first and second bidirectional host input/outputs.

6. The library virtualization module as claimed in claim 4, the processor further comprising instructions for causing the LVM to facilitate data splicing of data received at least one of said first and second bidirectional host input/outputs.

7. The library virtualization module as claimed in claim 1, the processor further comprising instructions for causing the LVM to block library reset SCSI commands received at least one of said first and second bidirectional host input/outputs.

8. The library virtualization module as claimed in claim 1, the processor further comprising instructions for causing the LVM to block library initialize SCSI commands received at least one of said first and second bidirectional host input/outputs.

9. A method using a processor comprising:
   providing at least first and second bidirectional host input/outputs, each for connection to a respective associated one of at least first and second hosts;

an providing a bidirectional library input/output, for connection to a library, said library having resources divisible into at least first and second divisions of resources, providing a library virtualization module (LVM), the LVM:
dividing said resources of said library between said at least first and second hosts to allocate a first division of resources to said first host and to allocate a second division of resources to said second host;
receiving Small Computer Serial Interface (SCSI) commands at said at least first and second bidirectional host input/outputs;
receiving a first SCSI command at the first bidirectional host input/output, the first SCSI command relating to a resource outside of the first division of resources;
modifying the first SCSI command, the only resources to which the modified first SCSI command relates being said first division of resources of said library;
providing said modified SCSI command to said bidirectional library input/output;
receiving at said bidirectional library input/output library resource information comprising one of:
a) address information relating to library resources,
b) information quantifying the library resources, and
c) address information relating to library resources and information quantifying the library resources, modifying said library resources information and providing the resulting modified information to one of said at least first and second bidirectional host input/outputs;
recording a unit attention signal received at said bidirectional library input/output following recording of said unit attention signal receiving an access request at said first bidirectional host input/output;
supplying data representative of said unit attention signal to said first bidirectional host input/output in response to receiving said access request at said first bidirectional host input/output, following said recording of said unit attention signal receiving an access request at said second bidirectional host input/output;
supplying data representative of said unit attention signal to said second bidirectional host input/output in response to said receiving said access request at said second bidirectional host input/output; and
deleting said unit attention signal subsequent to supplying said data representative of said unit attention signal to both of said first and second bidirectional host input/outputs.

10. The method as claimed in claim 9, further comprising modifying absolute addresses of resources of said library according to said at least first and second divisions of the resources.

11. The method as claimed in claim 9, further comprising queuing SCSI commands received at said bidirectional host input/outputs and passing queued SCSI commands to the bidirectional library input/output only on a determination that a previous SCSI command has been executed.

12. The method as claimed in claim 9, further comprising providing a second bidirectional library input/output.

13. The method as claimed in claim 12, further comprising facilitating mirroring of data received at least one of said first and second bidirectional host input/outputs.

14. The method as claimed in claim 12, further comprising facilitating data splicing of data received at least one of said first and second bidirectional host input/outputs.

15. The method as claimed in claim 9, further comprising blocking library reset SCSI commands received at least one of said first and second bidirectional host input/outputs.

16. The method as claimed in claim 9, further comprising blocking library initialize SCSI commands received at least one of said first and second bidirectional host input/outputs.

17. A library virtualization module (LVM) comprising:
at least first and second bidirectional host input/output means, each for connection to a respective associated one of at least first and second host means; and
a bidirectional library input/output means, for connection to a library, said library having resources divisible into at least first and second divisions of resources, a processor comprising instructions for causing the LVM to:
divide said resources of said library between said at least first and second host means to allocate a first division of resources to said first host means and to allocate a second division of resources to said second host means;
receive Small Computer Serial Interface (SCSI) commands at said at least first and second bidirectional host input/output means;
receive a first SCSI command at the first bidirectional host input/output means, the first SCSI command relating to a resource outside of the first division of resources;
modify the first SCSI command to provide a modified SCSI command so that the only resources to which the modified SCSI command relates are said first division of resources of said library;
provide said modified SCSI command to said bidirectional library input/output means;
receive at said bidirectional library input/output means library resource information comprising one of:
a) address information relating to library resources
b) information quantifying the library resources, and
c) address information relating to library resources and information quantifying the library resources, modify said library resource information to provide modified information, and provide the resulting modified information to one of said at least first and second bidirectional host input/outputs means; and
record a unit attention signal received at said bidirectional library input/output means:
following said recording of said unit attention signal receive an access request at said first bidirectional host input/output means;
supply data representative of said unit attention signal to said first bidirectional host input/output means in response to receiving said access request at said first bidirectional host input/output means, following said recording of said unit attention signal receive an access request at said second bidirectional host input/output means;
supply data representative of said unit attention signal to said second bidirectional host input/output means in response to said receiving said access request at said second bidirectional host input/output means; and
deleting said unit attention signal subsequent to supplying said data representative of said unit attention signal to both of said first and second bidirectional host input/output means.

18. The library virtualization module as claimed in claim 17, the processor further comprising instructions for causing the LVM to modify absolute addresses of resources of said library according to said at least first and second divisions of the resources.

19. The library virtualization module as claimed in claim 17, the electronically readable medium processor further comprising instructions for causing the LVM to queue SCSI commands received at said bidirectional host input/output means and to pass queued SCSI commands to the bidirectional library input/output means only on a determination that a previous SCSI command has been executed.

20. The library virtualization module as claimed in claim 17, further comprising a second bidirectional library input/output means.

21. The library virtualization module as claimed in claim 20, the processor further comprising instructions for causing the LVM to facilitate mirroring of data received at least one of said first and second bidirectional host input/output means.

22. The library virtualization module as claimed in claim 20, the processor further comprising instructions for causing the LVM to facilitate data splicing of data received at least one of said first and second bidirectional host input/output means.

23. The library virtualization module as claimed in claim 17, the processor further comprising instructions for causing the LVM to block library reset SCSI commands received at least one of said first and second bidirectional host input/output means.

24. The library virtualization module as claimed in claim 17, the processor further comprising instructions for causing the LVM to block library initialize SCSI commands received at least one of said first and second bidirectional host input/output means.

25. A library virtualization module (LVM) comprising:
at least first and second bidirectional host input/outputs, each for connection to a respective associated one of at least first and second hosts; and
a bidirectional library input/output, for connection to a library, said library having resources divisible into at least first and second divisions of resources
a processor comprising instructions for causing the LVM to:
divide said resources of said library between said at least first and second hosts to allocate a first division of resources to said first host and to allocate a second division of resources to said second host;
  receive Small Computer Serial Interface (SCSI) commands at said at least first and second bidirectional host input/outputs; receive a first SCSI command at the first bidirectional host input/output, the first SCSI command relating to a resource outside of the first division of resources; modify the first SCSI command, the only resources to which the modified first SCSI command relates being said first division of resources of said library; provide said modified SCSI command to said bidirectional library input/output;
  receive at said bidirectional library input/output means library resource information comprising one of:
  a) address information relating to library resources,
  b) information quantifying the library resources, and
  c) address information relating to library resources and information quantifying the library resources, modify said library resource information and provide the resulting modified information to one of said at least first and second bidirectional host input/outputs; and
  record a unit attention signal condition received at said bidirectional library input/output following recording of said unit attention signal receive an access request at said first bidirectional host input/output means;
  supply data representative of said unit attention signal to said first bidirectional host input/output means in response to receiving said access request at said first bidirectional host input/output means, following recording of said unit attention signal receive an access request at said second bidirectional host input/output means:
  supply data representative of said unit attention signal to said second bidirectional host input/output means in response to receiving said access request at said second bidirectional host input/output means: and
  deleting said unit attention signal subsequent to supplying said data representative of said unit attention signal to both of said first and second bidirectional host input/output means.

26. The library virtualization module as claimed in claim 25, the processor further comprising instructions for causing the LVM to modify absolute addresses of resources of said library according to said at least first and second divisions of the resources.

27. The library virtualization module as claimed in claim 25, the processor further comprising instructions for causing the LVM queue SCSI commands received at said bidirectional host input/outputs and pass queued SCSI commands to the bidirectional library input/output only on a determination that a previous SCSI command has been executed.

28. The library virtualization module as claimed in claim 25, further comprising a second bidirectional library input/output.

29. The library virtualization module as claimed in claim 28, the processor further comprising instructions for causing the LVM to facilitate mirroring of data received at least one of said first and second bidirectional host input/outputs.

30. The library virtualization module as claimed in claim 28, the processor further comprising instructions for causing the LVM to facilitate data splicing of data received at least one of said first and second bidirectional host input/outputs.

31. The library virtualization module as claimed in claim 25, the processor further comprising instructions for causing the LVM to block library reset SCSI commands received at least one of said first and second bidirectional host input/outputs.

32. The library virtualization module as claimed in claim 25, the processor further comprising instructions for causing the LVM to block library initialize SCSI commands received at least one of said first and second bidirectional host input/outputs.

* * * * *